United States Patent

[11] 3,588,636

[72] Inventors William Otto Giesfeldt
Milwaukee;
Roy Lee Pinnow, Wauwatosa, Wis.

[21] Appl. No 794,020
[22] Filed Jan. 27, 1969
[45] Patented June 28, 1971
[73] Assignee Globe-Union Inc.
Milwaukee, Wis.

[54] OHMIC CONTACT AND METHOD AND COMPOSITION FOR FORMING SAME
9 Claims, 5 Drawing Figs.

[52] U.S. Cl. ........ 317/238, 317/230
[51] Int. Cl. ........ H01l 3/20
[50] Field of Search ........ 317/230, 231, 233, 237, 238

[56] References Cited

UNITED STATES PATENTS

| | | | |
|---|---|---|---|
| 2,692,212 | 10/1954 | Jenkins | 317/238 |
| 2,854,611 | 9/1958 | Smith | 317/238X |
| 3,268,783 | 8/1966 | Saburi | 317/230X |
| 3,351,500 | 11/1967 | Khauri | 317/238X |
| 3,419,758 | 12/1968 | Hayakawa et al. | 317/230 |

*Primary Examiner*—James D. Kallam
*Attorney*—Pendleton, Neuman, Williams & Anderson

ABSTRACT: A semiconductive device such as a reduced barium titanate is provided with at least one ohmic contact consisting essentially of a hypoeutectic alloy of nickel and indium. The contact may be formed by applying to the surface of the semiconductor a layer of a composition containing reducible compounds of nickel and indium and then firing the device at a liquifying temperature under reducing conditions.

PATENTED JUN 28 1971 3,588,636

INVENTORS
WILLIAM OTTO GIESFELDT
ROY LEE PINNOW
BY: Pendleton, Neuman
Seibold & Williams
ATTY'S

OHMIC CONTACT AND METHOD AND COMPOSITION FOR FORMING SAME

This invention relates to semiconductors and more particularly to semiconductors having at least one ohmic contact and a method and paint composition for forming that contact. The invention is particularly adapted for use in connection with reduced titanate N-type semiconductor devices, especially reduced barium titanate semiconductor devices, including those containing small amounts of bismuth.

One problem encountered in the manufacture of semiconductors is the formation of an ohmic contact on the semiconductor. An ohmic contact is one which obeys Ohm's Law, the current passing through it to the semiconductor being always proportional to the voltage applied regardless of polarity. Such contacts are employed between the semiconductor and a conducting body or between the semiconductor and another semiconducting body.

To be ohmic, the contact must have very low resistance and no rectifying properties; at the same time, because it is an electrical contact, there must be a strong bond between the ceramic semiconductor and the metallic body of the contact. One problem has been the tendency of a barrier layer of high impedance to be formed between the ceramic semiconductor and the metallic contact. The presence of the barrier layer results in a junction having rectifying properties and thus prevents the contact from acting as an ohmic contact. If the semiconductor is used as a capacitor employing one nonohmic contact, the presence of a second nonohmic contact will result in two capacitors in series and, of course, a lower capacitance for the unit. The barrier layer phenomenon occurs in those ceramic semiconductor materials which are susceptible to oxidation, and it is especially likely to occur if the ceramic body is subjected to a heat treatment in air either during or after the formation of the contact.

One common method of providing an adherent contact on a semiconductor is by firing a thin silver layer onto the surface of the semiconductor. This is usually accomplished by coating the semiconductor surface with a suspension containing silver or a compound of silver such as, for example, silver oxide or silver acetate and then firing by heating the coated semiconductor in air at about 1,700° F. This method is simple; it is sure; it is adapted to mass production techniques; and it permits almost any type of metallic conductor to be attached thereto by soldering. The difficulty is that with easily oxidizable semiconductors such as the alkaline earth titanates and particularly barium titanates, the high impedance barrier layer forms between the contact and the semiconductor. The barrier layer formation has been found to be particularly acute and difficult to prevent in a barium titanate containing bismuth.

Recently there has been some development work on processes for the formation of nickel electrodes in ohmic contact with semiconductive substrates. Although ohmic contacts may be formed under carefully controlled conditions by processes such as the chemical reduction or "electroless nickel" processes, these contact forming processes for the most part have been complex and not susceptible to use in a mass production. Even under optimum conditions there has been a tendency toward long termed instability of the nickel contact. Moreover, if a firing process is employed, the nickel may react adversely with the doping agents such as bismuth impurities employed in the semiconductive materials, resulting in a poor bond between the substrate and contact and the tendency toward formation of the high impedance layer at the interface.

It is an object of this invention to provide a strongly adherent ohmic contact on the surface of a semiconductive oxidic ceramic body, particularly barium titanate ceramic bodies, including those containing small amounts of bismuth. The composition and method of formation are such that there is no concomitant formation of a high impedance barrier layer at the interface of the contact and semiconductor. The contact is formed by a process and through the use of a paint composition which not only avoids the formation of the barrier layer at the interface of the ohmic contact and the semiconductor body but, also, permits the formation of a fired silver nonohmic contact at one portion of the semiconductor surface simultaneously with the formation of a fired silver coating over the ohmic contact. The process is completely adaptable for mass production use, and the contact produced thereby is stable, exhibiting excellent ohmic properties with a high strength of bond between the contact and the semiconductor body. The process employs a fired-on technique which is simple and completely in keeping with rapid production systems, but which heretofore had not been available for the production of ohmic contacts, particularly nickel contacts which generally require high firing temperatures.

In accordance with one embodiment of the invention, a semiconductor device is provided comprising a semiconductor element having at least one ohmic contact consisting essentially of a hypoeutectic alloy of nickel and indium. The semiconductor element is preferably a titanate ceramic semiconductor such as, for example, a reduced barium titanate ceramic semiconductor. The hypoeutectic alloy of nickel and indium employed for the ohmic contact should contain from about 80 percent to about 95 percent by weight of nickel and from about 5 percent to about 20 percent by weight of indium. Best results are obtained when the nickel is maintained in the range of 80 percent to 90 percent and the indium in the range of 10 percent to 20 percent.

The ohmic contact may be formed by employing a firing composition comprising a mixture of a finely divided reducible compound of nickel and a finely divided reducible compound of indium, the mixture being carried in a volatile vehicle. The reducible compounds are preferably oxides of the metals.

One method of forming the ohmic contact is to apply the firing composition in a dispersion to the surface of the semiconductor element and then heat the coated element in a reducing atmosphere at a temperature just sufficient to liquify the compounds, thus volatilizing the dispersant or vehicle and reducing the compounds to metallic nickel and indium.

In the drawings the semiconductor is illustrated in its various stages of processing to form a polarized capacitor having one ohmic contact and one nonohmic contact.

Figure 4:
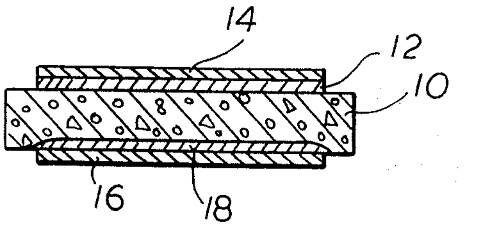
Figure 5:
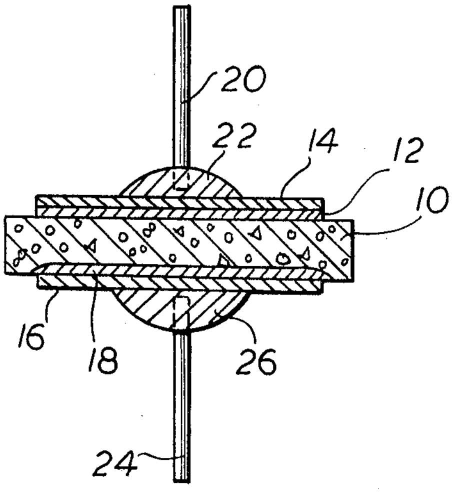

FIG. 4 is a schematic sectional view showing the ceramic body after a silver firing composition has been applied to the reverse side of the body, and the body has been subjected to a firing temperature to provide a silver coated ohmic contact on the top and a silver nonohmic contact on the bottom; and FIG. 5 is a schematic sectional view showing the ceramic body after the lead wires have been soldered to the two contacts.

Figure 1:
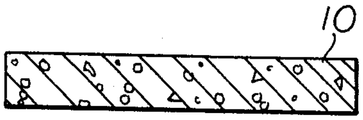
FIG. 1 is a schematic sectional view showing a semiconductive ceramic element prior to the application of the contacts to the surface thereof.

In FIG. 1 there is shown a semiconductive ceramic body 10 consisting of an oxidic material. In this case the composition is an alkaline earth titanate, specifically, barium titanate. The ceramic body 10 may be prepared using a basically barium titanate by pelletizing the powdered composition and firing under oxidizing conditions at a temperature of on the order of 2,400° F. The body is slowly heated to the firing temperature and then held at the temperature for at least ½ hour. It is then slowly cooled. The gradual heating and cooling is intended to facilitate binder decomposition and maturing of the ceramic while preventing induced stresses by heat shock. Although the total time at the firing temperature may be only about ½ hour, the total heating and cooling cycle may run as long as 16 hours.

The ceramic body at this stage is an insulator and must be subjected to reduction in order to give it semiconductive properties.

Reduction of the ceramic is carried out in sealed refractory containers or special atmosphere kilns. Temperatures of from about 1,700° F. to 2,300° F. for ½ hour to 4 hours are used depending upon the ceramic composition and the equipment employed. The reducing atmosphere is preferably at least 10 percent pure hydrogen or forming gas (10 percent $H_2$). The ceramic substrate (see FIG. 1) which through the reduction process has become a semiconductor is then ready for the application of the contacts. In the illustrated embodiment the reduced barium titanate semiconductor is employed as a junction capacitor having one rectifying or nonohmic contact and one nonrectifying ohmic contact. Heretofore, it has been common to construct barium titanate capacitors with two rectifying junctions on the semiconducting body which, in effect, places the capacitors in series and results in half the capacitance which could be achieved if one of the contacts where an ohmic contact. However, it has been difficult to form an ohmic contact on the surface of a reduced barium titanate semiconductor, particularly when the reduced barium titanate semiconductor contained small percentages of bismuth or, more properly, bismuth trioxide. This has been so because a barrier layer of high impedance tends to form between the contact and the body of the semiconductor.

Figure 2:
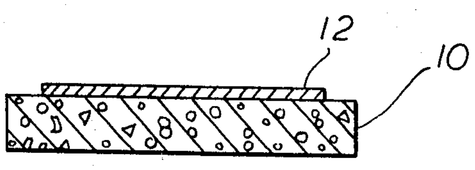
FIG. 2 is a sectional view corresponding to FIG. 1 showing the semiconductive ceramic body after the ohmic contact has been formed on one surface thereof.

It has been found, however, that a contact 12 (see FIG. 2) consisting essentially of a hypoeutectic alloy of nickel and indium may be satisfactorily formed on and bonded to the surface of the barium titanate semiconductor without the concomitant formation of the high impedance barrier layer. The eutectic of nickel and indium contains 60.54 percent (by weight) nickel and 39.46 percent (by weight) indium, and thus the hypoeutectic alloy of nickel and indium would contain less than 39.46 percent indium. The hypoeutectic alloy should contain from about 5 percent to about 20 percent indium and from about 80 percent to about 95 percent nickel. If the indium is greater than about 20 percent, the alloy does not always satisfactorily bond to the ceramic substrate at the temperatures required for reduction. On the other hand if the percentage of indium is less than about 5 percent, the ohmic characteristics of the contact will, in general, not be satisfactory, and there will be an increase in the temperature required to liquify the alloy and fire the contact on the surface of the ceramic substrate. It is preferred that the nickel be maintained in the range of 80 percent to 90 percent and the indium in the range of 10 percent to 20 percent, since the best and most consistent results are obtained in this range.

Figure 3:
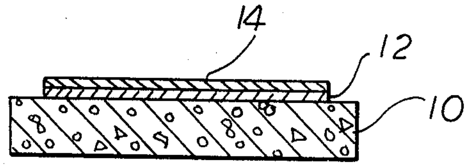
FIG. 3 is a sectional view corresponding to FIGS. 1 and 2 showing the ceramic body after a silver firing composition has been applied to the surface of the ohmic contact.

After the nickel-indium ohmic contact 12 has been formed on the surface of the ceramic substrate 10, a layer of silver 14 may be applied over the ohmic contact 12 (see FIG. 3). As previously stated, in the illustrated embodiment the ceramic substrate 10 and ohmic contact 12 (with its silver overlay 14) are employed in a barrier layer capacitor. Therefore, on the opposite side of the semiconductive substrate 10 a silver electrode 16 is applied (see FIG. 4). It will be noted that at the interface of the silver electrode 16 and the semiconductive body 10 there is a barrier layer 18 which causes the silver electrode 16 to act as a nonohmic or rectifying contact for the semiconductive body 10. The silver layer 14 provides a solderable surface for the attachment of a lead 20 through a solder joint 22, and the silver electrode 16 not only serves as a nonohmic contact, but it also provides a solderable surface for the attachment of a lead 24 through a solder joint 26 (see FIG. 5).

The nickel and indium alloy may be applied in any desired manner. The metals may be applied simultaneously or in layers and then fired to cause diffusion thereof. Vacuum deposition may be employed followed by firing of the layer or layers to produce the desired contact. Alternatively, an alloy of the metals may be ground into powder and the powder applied in a layer of the desired thickness, usually less than about 3 mils, onto the ceramic substrate. This would then be fired to coalesce the powder particles and to wet the surface of the ceramic substrate so that the unitary alloy contact will be tightly bonded to the surface of the ceramic substrate.

It is preferred, however, that the nickel and indium components of the composition be applied in a paint or firing composition comprising a mixture of a finely divided reducible compound of nickel and a finely divided reducible compound of indium, the compounds being reducible to their elemental metals, and the nickel and indium being present in the mixture in such proportions that when the mixture is heated to liquifying temperature in a reducing atmosphere and then cooled, a hypoeutectic of nickel and indium will be formed.

It is preferred that the reducible compounds of the metals, nickel and indium, be in the form of the oxides of these metals. The oxides of nickel may, for example, be the monoxide of nickel, commonly referred to as nickel oxide (NiO), or it may occur as nickel sesquioxide ($Ni_2O_3$). Indium may occur as the sesquioxide of indium, commonly referred to as indium oxide ($In_2O_3$), or it may occur as indium monoxide (InO), or indium suboxide ($In_2O$). The most common and preferred forms are the nickel oxide (NiO) and the indium oxide ($In_2O_3$). Other reducible compounds of the metals may be their carbonate or resinate forms, which, like their oxide forms, reduce to the elemental metals. In the case of a resinate, a resin may be produced, but this will be driven off during firing.

The oxides may be spread in their powder form, but it is preferred that they be suspended in a volatile dispersant which will be driven off during the firing process. The dispersant or vehicle is preferably an organic film-forming vehicle based or cellulosic, acrylic or terpene resins. One such dispersant comprises an ethyl cellulose resin in combination with a slow-drying, aromatic solvent such as, for example, a high boiling point xylene. The powders of nickel oxide and indium oxide, which should be finer than about 325 mesh, are thoroughly mixed in a conventional grinder and then blended with the vehicle. The fineness of the powders and the consistency or fluidity of the vehicle are preferably such that the resultant "paint" is screenable, i.e., capable of being painted by a conventional screen painting process.

The suspended mixture is applied, preferably in a layer of about 3 mils in thickness, to the semiconductor substrate 10. The application may be by screen painting or by any other suitable painting method, such as spraying or brushing. The applied layer is then dried at a temperature of between about 250° F. and 300° F. for about 5 minutes in order to drive off the solvent portion of the volatile dispersant and provide a hardened film of the nickel oxide—indium oxide composition on the ceramic substrate. The layer is then fired under reducing conditions in order to reduce the compounds to their elemental metals and form the hypoeutectic alloy of nickel and indium.

The firing temperature may be between 1,660° F. and about 2,000° F. temperature being the lower limit because this is the lowest temperature at which nickel and indium will liquify; i.e., the eutectic temperature. The hypoeutectic alloys will require higher temperatures for melting, the temperature required increasing with the nickel content of the alloy. The firing temperature is preferably between about 1,850° F. and 1,950° F., with the firing time being about 20 to 30 minutes. This firing operation is intended also to cause the resin binder portion of the volatile dispersant to be driven off, providing a pure alloy of nickel and indium.

The reducing conditions are obtained by heating in a reducing atmosphere containing at least 10 percent of a reducing gas such as, for example, hydrogen. Other suitable gases such as carbon monoxide, cracked ammonia, or forming gas (10 percent $H_2$) may be utilized. As used herein the term "reducing conditions" is intended to include any gaseous condition which will result in the reduction of the compounds to their metallic forms during the heating of the compounds to their liquifying temperature. The dew point of the reducing atmosphere during firing is preferably maintained in the range of between +20° F. and −20° F. to promote the reduction of the nickel and indium oxides. While, generally, the reduction of the nickel indium layer will be accomplished subsequent to the reduction of the ceramic substrate, the reduction of the two can be accomplished simultaneously since both reductions may employ substantially the same temperatures and atmospheres for substantially the same periods of time in order to effect the respective reductions. In the case of a reduced barium titanate ceramic semiconductor, for example, the paint composition may be applied to the unreduced titanate ceramic and the whole part then fired in the range of about 1,950° F. to 2,000° F. in a reducing atmosphere for about 30 minutes to thereby produce a reduced semiconductor having an ohmic nickel indium electrode or contact. In this case, because of the higher temperature required, the alloy should be a 90 percent nickel, 10 percent indium alloy. While the temperatures and times of reduction may thus overlap for the ceramic and for the firing composition for the contact, temperatures much in excess of 1,950° F. and holding times of greater than 30 minutes may sometimes result in agglomeration of the alloy on the surface of the ceramic with possible adverse effect on the ohmic properties of the contact produced.

In order to provide a solderable surface for the attachment of a lead 20 and also to protect the ohmic contact through further processing steps, it is preferred that a film of silver or other metal be applied over the nickel indium contact. This silver layer 14 may be applied using conventional firing techniques, and it may be conveniently formed simultaneously with the nonohmic silver electrode 16 on the reverse side of the semiconductor. The firing compositions for the two silver layers 14 and 16 should, however, be slightly different since the barrier layer 18 is desired and intended between the silver layer 16 and the ceramic substrate 10, but is is not desired between the ohmic contact 12 and either the ceramic substrate 10 or the silver layer 14. The paint composition used to provide the layer 16 should contain between about 6 percent to about 11 percent bismuth trioxide ($Bi_2O_3$) because bismuth trioxide promotes the formation of the barrier layer 18. However, the paint composition used to produce the silver layer 14 overlying the ohmic contact 12 should be a silver paint free of bismuth trioxide so that no barrier is formed and the contact remains ohmic.

The paint composition used to produce the layer 14 may be a silver or silver oxide ($Ag_2O$) dispersion in an organic resinous vehicle. At the firing temperature of about 1,700° F. the particles coalesce to make a continuous silver film contiguous with the substrate. The paint used to form the electrode 16 may be a finely divided silver together with an inorganic binder consisting of borosilicate frit and bismuth trioxide. Here again the particles coalesce at the firing temperature and apparently the bismuth trioxide diffuses into the region of the substrate-contact interface, forming the barrier layer 18. It is preferred that the layers 14 and 16 be individually applied and dried at a temperature of about 300° F. prior to the firing of both layers at about 1,700° F. under oxidizing conditions. This single oxidizing firing step may be utilized to sinter both the silver containing the bismuth trioxide frit and the silver containing the bismuth free frit.

The following examples are intended to further illustrate the invention:

Example 1. A barium titanate ceramic substrate is prepared by pelletizing the powdered composition and firing under oxidizing conditions at 2,400° F. for at least ½ hours. The ceramic substrate is then reduced by firing at a temperature of 2,000° F. for ½ hour in a 10 percent $H_2$ atmosphere followed by cooling. The surface of the substrate is screen painted with the "paint" consisting of a mixture of 90.5 grams of nickel oxide (NiO) powder and 9.5 grams of indium oxide ($In_2O_3$) powder dispersed in 50 grams of a vehicle, half of which is an ethyl cellulose vehicle and the other half of which is a high boiling point xylene solvent. The coated substrate is then dried for 5 minutes at 300° F. and then fired under reducing conditions (cracked ammonia) at a temperature of 1,950° F. to form a hypoeutectic nickel indium alloy contact containing 90 percent nickel and 10 percent indium.

The contact produced is found to be ohmic an there is a good bond between the contact and the reduced barium titanate semiconductive substrate.

Example 2. A second reduced barium titanate substrate is prepared in accordance with Example 1. The surface of the substrate is screen painted with "paint" consisting of a mixture of 85.5 grams of nickel oxide powder and 14.5 grams of indium oxide powder dispersed in an ethyl cellulose-xylene vehicle in accordance with Example 1. The coated substrate is then dried for 5 minutes at 300° F. and then fired under reducing conditions (cracked ammonia), at a temperature of 1,950° F. to form a hypoeutectic nickel indium alloy contact containing 85 percent and 15 percent indium.

The contact produced is found to be ohmic and there is a good bond between the contact and the reduced barium titanate semiconductive substrate.

Example 3. A third reduced barium titanate substrate is prepared in accordance with Example 1. The surface of the substrate is screen painted with "paint" consisting of a mixture of 81 grams of nickel oxide powder and 19 grams of indium oxide powder dispersed in an ethyl cellulose-xylene vehicle as in Example 1.

The coated substrate is then dried for 5 minutes at 300° F. and then fired under reducing conditions (cracked ammonia) at a temperature of 1,800° F. to produce a hypoeutectic nickel indium alloy contact containing 80 percent nickel and 20 percent indium.

The contact produced is found to be ohmic and there is a good bond between the contact and the reduced barium titanate semiconductive substrate.

The firing temperature for the contact will depend upon the nickel and indium content of that contact. The higher the nickel content, the higher will be the melting point of the alloy and the higher should be the firing temperature for the contact in order to get a good bond between the contact and the ceramic substrate. The higher the indium content the lower the firing temperature which is needed and, indeed, which is acceptable. It is preferred that the firing temperature be just above the liquidus line of the nickel indium equilibrium diagram. If the firing temperature exceeds the liquifying temperature by more than about 100° F., the nickel indium layer may tend to agglomerate, and the ohmic characteristics of the contact may be adversely affected. Within the firing temperature range of 1,800° F. to 1,950° F. the nickel content may vary from about 80 percent to about 90 percent, and the indium content may vary from about 10 percent to about 20 percent An ohmic contact may be produced with an alloy of about 95 percent Ni and 5 percent In, however, the firing temperatures for this contact would exceed 1,950° F. and this could adversely affect some substrates.

In order to protect the ohmic contact is is highly desirable that a conductive film be applied over the surface thereof, the film preferably being in the nature of a silver film applied by the conventional fired -on process as previously described. This permits the contact to withstand further coating applications, heating steps, or solder dipping, and also provides a solderable surface for the attachment of leads.

Contacts of this type may be applied to a wide variety of semiconductive materials, especially the oxide semiconductors. These not only include the reduced barium titanate semiconductors which have been described herein, but is also includes manganous oxide (MnO), ferric oxide ($Fe_2O_3$), gallium oxide ($Ga_2O$), nickel oxide (NiO), cuprous oxide ($Cu_2O$), titanium oxide ($TiO_2$), plus other more complex oxides such as zinc ferrate ($ZnFe_2O_4$), strontium titanate ($SrTiO_3$), and the like. Preferred materials within this oxide group are the alkaline earth titanates and zirconates, such as barium titanate, strontium titanate calcium titanate, barium zirconate, magnesium zirconate, and the like. Other metal titanates and zirconates may also be used as substrates, for example, lead titanate, lead zirconate, and the like.

The composition of this invention is especially well suited for utilization with N-type semiconductive material, whether such material is formed by reduction of a ceramic substrate, doping of a ceramic with impurities, or otherwise. Also included, however, are materials in the form of substantially pure crystals which have intrinsic semiconductor properties, as well as P-type semiconductors It is contemplated that any impurities, or doping agents, may be employed with the above semiconductive materials, including conventional impurities, such as, for example, lanthanum, bismuth, boron, indium, antimony, and the like, Bismuth-doped barium titanate ceramics, moreover, are especially adaptable for use with the composition.

The contacts produced in accordance with this invention bond very well to the ceramic semiconductor substrate, and they are characterized by the retention of their ohmic qualities over long periods of time under widely varying temperature and voltage conditions.

Is to be understood that the present disclosure has been made only by way of example and that many additional modifications, changes, and various details may be resorted to without departing from the spirit and scope of the invention as hereinafter claimed.

We claim:

1. A semiconductor device comprising a semiconductive element having at least one ohmic contact consisting essentially of a hypoeutectic alloy of nickel and indium.

2. The device of claim 1 wherein said semiconductive element is a ceramic oxide semiconductor.

3. The device of claim 1 wherein said semiconductive element is a titanate ceramic semiconductor.

4. The device of claim 1 wherein said semiconductive element is a barium titanate ceramic semiconductor.

5. The device of claim 1 wherein said semiconductive element is an alkaline earth metal titanate ceramic containing bismuth.

6. The device of claim 5 wherein said semiconductive element is a reduced barium titanate ceramic containing bismuth.

7. The device of claim 1 wherein said ohmic contact consists essentially of a nickel alloy containing from about 80 percent to 95 percent by with nickel and from about 5 percent to about 20 percent by weight indium.

8. The device of claim 1 wherein a fired silver layer overlies said contact.

9. The device of claim 1 wherein said fired silver layer is free of bismuth.

UNITED STATES PATENT OFFICE

CERTIFICATE OF CORRECTION

Patent No. 3,588,636 Dated June 28, 1971

Inventor(s) William Otto Giesfeldt and Roy Lee Pinnow

It is certified that error appears in the above-identified patent and that said Letters Patent are hereby corrected as shown below:

Column 1, line 57, after "to use in" delete "a"

Column 1, line 59, "long termed" should be --long term--

Column 2, line 66, "the temperature" should be --that temperature--

Column 3, line 17, "where" should be --were--

Column 4, line 25, after "based" change "or" to --on--

Column 4, line 49, after "2000°F. insert --, the 1660°F.--

Column 5, line 59, "hours" should be --hour--

Column 5, line 73, "an" should be --and--

Column 6, line 10, after "85 percent" insert --nickel--

Column 6, line 44, after "percent" (second occurrence) insert a period (.)

Column 6, line 60, after "but" delete "is" and insert --it--

Column 6, line 67, insert a comma (,) after "strontium titanate"

Column 7, line 2, after "semiconductors" insert a period (.)

Column 7, line 6, after "like" delete the comma and insert a period (.)

Column 8, line 16, after "by" delete "with" and insert --weight--

Signed and sealed this 18th day of January 1972.

(SEAL)
Attest:

EDWARD M.FLETCHER,JR.
Attesting Officer

ROBERT GOTTSCHALK
Acting Commissioner of Patents